3,589,976
COMPOSITE FILMS OF POLYOLEFINS AND POLYSTYRENE

Louis F. Erb, Nixon, N.J., assignor to Hercules Incorporated, Wilmington, Del.
No Drawing. Filed Mar. 24, 1967, Ser. No. 625,629
Int. Cl. B29c 27/00; B32b 27/08
U.S. Cl. 161—165                        3 Claims

ABSTRACT OF THE DISCLOSURE

Composite film of coextruded polystyrene and polyolefins exhibit a favorable balance of the stiffness of polystyrene and other tensile properties of polyolefins. Surprisingly, little effect on low temperature impact strength is noted, surface properties are improved as compared to those of polyolefins alone.

---

This invention relates to composite films of certain thermoplastic materials, which films exhibit a favorable combination and balance of properties. More specifically, it relates to composite films comprised of a center layer of polystyrene and one or two surface layers of a crystalline polyolefine.

In the past, films combining the properties of two polymeric materials have frequently been prepared from homogeneous blends of the two polymers. This technique has not been entirely successful, however, since the properties of each material are usually altered to an undesirable degree as a result of the blending. Additionally, there are almost always problems to be resolved caused by the relative incompatibility of the materials.

Another type of film that has been employed is the conventional laminated film, prepared by adhering together two or more layers of preformed film. These have also been less than satisfactory, due partly to the necessity for binding the layers which frequently is difficult when working with dissimilar polymers. Also, the thin films which must be laminated in order to produce acceptably thin composites in this manner are extremely difficult to work with.

The films contemplated by the instant invention are composite films containing several film-forming polymeric materials, but which overcome most of the objectionable problems encountered by the prior art films prepared from a plurality of polymers. By "composite film" is meant a film, in the nature of a laminate, having two or more distinct polymer layers, formed by the co-extrusion of the polymeric components under conditions such that the two or more component layers come into contact with each other while they are molten. Specifically, the invention is a composite film comprising a center layer of polystyrene, surfaced on at least one side with a co-extruded layer of a crystalline polyolefin. Alternatively, the crystalline polyolefin can comprise the center layer and the polystyrene the outer layer or layers. These, however, are less useful. The invention will be presented in terms of polystyrene being the center layer; however, it should be borne in mind that polystyrene is also contemplated for use as surface layer.

Methods and apparatus which can be used for preparing composite films according to this invention are known. Such apparatus generally comprises an extrusion die having two, three or more, usually three, internal polymer receiving cavities, fed simultaneously by two or more synchronized polymer metering pumps. The cavities are so arranged as to meet and discharge polymer at a common point, either immediately before or immediately following emergence of the several streams from the body of the die, contact thus being made between the polymer components while the same are still in the molten state. The film-forming equipment can be either of the tubular type or the flat type. Examples of suitable apparatus can be seen in e.g., U.S. 3,223,761 to Raley, or Belgian Pat. 653,675, inter alia.

The composite films of the instant invention are characterized by possessing the stiffness of polystyrene in combination with the durability, strength, and other desirable properties of the polyolefin. Very unexpectedly, it is found that the impact strength of the composite at low temperature is very little changed, as compared with that of an unmodified film of the corresponding polyolefin. This is surprising, in view of the fact that polystyrene normally has substantially less low temperature impact strength than do the other polyolefins. Another surprising discovery was that the surface gloss and the coefficient of friction are both improved in the composites as compared to controls of polyolefin alone. Since both of these properties would normally be thought of as surface phenomena, it could not have been predicted that a center layer of polystyrene would have a significant effect thereon.

Composite films according to the invention can be prepared in a range of thicknesses, the limits of which are established primarily by equipment limitations and by utility of the finished product. In general, the films will have a total thickness of about ½ to 20 mils, preferably ½ to 3 mils.

The polystyrene core layer can have thickness varying from about 5 to 40% of the total thickness or total mass of the film. This layer can be any conventional film-forming polystyrene, usually one having melt flow rate (ASTM D1238–62T COND. G) of about 2 to 20 G/10 min.

The remainder of the composite film is the crystalline polyolefin. The polyolefin can be present on one or both sides of the polystyrene layer. Preferably, it will be on both sides of the polystyrene, as this configuration yields the optimum combination of polyolefin and polystyrene properties. This combination is also the most versatile in terms of utility as a packaging material.

The polyolefin portion of the composite film is preferably high density polyethylene, medium density polyethylene, low density polyethylene, crystalline (isotactic or stereoregular) polypropylene, or a crystalline copolymer of ethylene and propylene. Depending upon the ultimate end use contemplated for the film, the molecular weight of the polymer can vary within wide limits. Molecular weight can be expressed in terms of the melt flow rate of the polymer. The preferred melt flow rate range for the polyolefins employed in the composite films of this invention is between about 2 and 20.

In addition to the preferred polyolefins discussed in the preceding paragraph, other polyolefins can be employed if their specific properties are desired. One such other polyolefin, in particular, is poly(butene-1). Also useful in certain instances are crystalline copolymers of these lower olefins, particularly ethylene, with small amounts, up to about 10% of polar vinyl monomers such as vinyl acetate, vinyl chloride, ethyl acrylate, or the like.

The composite films according to the instant invention are normally used in their original, as extruded, form. That is, they are used as non-oriented films. However, they can also be oriented in some cases, if desired.

Composite films of the type contemplated by this invention find their greatest utility as wrapping and packaging materials. They can be used in all packaging applications where thermoplastic film is normally employed. The thinner films, i.e., up to about 5 mils in thickness are used in flexible packaging such as plastic bags, breadwrap, and the like. The thicker films, more commonly referred to as sheets, are employed in thermoforming applications to form rigid packages such as e.g., butter tubs, ice cream cartons, freezer packs, and the like.

The polyolefin will, usually, be stabilized, as is customary in most applications for these materials. Any of the well known light and heat stabilizers and antioxidants can be employed for this purpose. In addition, other filler materials, as needed, can be added, as e.g., pigments, fillers, and the like. Similarly, the polystyrene fraction of the composite will contain a stabilizer and other fillers if needed.

EXAMPLES 1–3

Composite films were prepared by co-extrusion of a polystyrene center layer with equal layers of stereoregular polypropylene on each of its surfaces. The polystyrene was a general purpose polystyrene having melt flow rate (ASTM D1238—62T COND. G) of about 6. The stereoregular polypropylene had melt flow rate of 8 by the same test. Films of various thicknesses were prepared. Physical property measurements on these films are recorded in the following table.

TABLE I

| Example No. | Olefin polymer | Polystyrene content, percent | Thickness, mil | Stiffness [1] | Tensile strength [2] | Impact [3] Rm. | Impact [3] 0° | Gloss [4] | Coefficient of friction (kinetic) |
|---|---|---|---|---|---|---|---|---|---|
| Control | Polypropylene | 0 | 3 | 115,000 | 5,635 | 0.73 | 0.03 | 92 | 0.64 |
| 1 | do | 13 | 3 | 143,000 | 3,410 | 0.03 | 0.04 | 93 | 0.70 |
| Control | do | 0 | 2 | 114,000 | 5,805 | 0.66 | 0.04 | 92 | 0.73 |
| 2 | do | 13 | 2 | 152,000 | 3,865 | 0.14 | 0.05 | 94 | 0.76 |
| Control | do | 0 | 1 | 126,000 | 6,425 | 0.18 | 0.04 | 92 | 0.78 |
| 3 | do | 13 | 1 | 150,000 | 3,845 | 0.09 | 0.05 | 94 | 0.91 |

[1] Secant modulus of elasticity at 1% strain expressed as the average of the machine direction and cross direction values (lbs./in.²).
[2] Ultimate tensile strength expressed as the average of the machine direction and cross direction values (lbs./in.²).
[3] Dart drop impact strength (ft.-lbs./mil.).
[4] 45° specular gloss.

The data in Table I show several improved properties in several respects which could not have been predicted. In each instance, the coefficient of friction and the gloss were higher in the composites than in the films of 100% polypropylene. Since both of these properties as stated above, are usually thought of as surface phenomena, this was surprising to find. The composite can also be seen to be substantially stiffer than their all polypropylene counterparts.

Also noteworthy in these data is the low temperature impact strength of the composites. In each case that of the composite is greater than that of the polypropylene control. This could not have been predicted since polystyrene alone has a virtually unmeasurable low temperature impact strength.

EXAMPLES 4–15

Films were made up of polystyrene with two layers of medium density polyethylene having a density of about 0.93 gm./cc. at 23° C. Other films were prepared where the surface layers were comprised of a crystalline block copolymer of ethylene and propylene containing about 3% ethylene. Physical properties of the films are recorded in Table II.

TABLE II

| Example No. | Polyolefin | Polystyrene content | Thickness | Stiffness [1] | Tensile strength [2] | Impact [3] Room | Impact [3] 0° | Gloss [4] | Coefficient friction (kinetic) | Heat seal range [5] |
|---|---|---|---|---|---|---|---|---|---|---|
| Control | Polyethylene | 0 | 3 | 31,000 | 3,030 | 0.58 | 0.91 | 85 | 0.23 | 30 |
| 4 | do | 26 | 3 | 123,000 | 1,825 | 0.08 | 0.10 | 85 | 0.38 | 100 |
| 5 | do | 14 | 3 | 88,000 | 2,555 | 0.17 | 0.22 | 83 | 0.31 | 90 |
| Control | do | 0 | 2 | 28,000 | 3,615 | 0.53 | 0.72 | 83 | 0.36 | 50 |
| 6 | do | 26 | 2 | 120,000 | 1,715 | 0.08 | 0.11 | 87 | 0.67 | 80 |
| 7 | do | 14 | 2 | 89,000 | 2,560 | 0.20 | 0.26 | 85 | 0.53 | 80 |
| Control | do | 0 | 1 | 26,000 | 2,635 | 0.69 | 0.41 | 85 | 0.97 | 50 |
| 8 | do | 26 | 1 | 117,000 | 1,720 | 0.10 | 0.09 | | | 80 |
| 9 | do | 14 | 1 | 84,000 | 2,590 | 0.21 | 0.34 | 87 | 1.2 | 70 |
| Control | Ethylene/propylene copolymer | 0 | 3 | 83,000 | 6,125 | 1.07 | 0.24 | 87 | 0.98 | 50 |
| 10 | do | 25 | 3 | 167,000 | 2,890 | 0.12 | 0.06 | 92 | 1.30 | 60 |
| 11 | do | 12 | 3 | 126,000 | 3,865 | 0.24 | 0.08 | 89 | 0.97 | 50 |
| Control | do | 0 | 2 | 84,000 | 6,305 | 1.08 | 0.13 | 84 | 0.85 | 60 |
| 12 | do | 25 | 2 | 169,000 | 775 | 0.08 | 0.06 | 90 | 1.02 | 80 |
| 13 | do | 12 | 2 | 132,000 | 3,865 | 0.25 | 0.07 | 86 | 0.88 | 60 |
| Control | do | 0 | 1 | 90,000 | 6,360 | 1.28 | 0.10 | 82 | 0.55 | 60 |
| 14 | do | 25 | 1 | 178,000 | 1,280 | 0.08 | 0.06 | 85 | 0.74 | 110 |
| 15 | do | 12 | 1 | 132,000 | 4,340 | 0.17 | 0.05 | 85 | 0.65 | 80 |

[1][2][3][4] See Table I, column 3.
[5] Determined at 20 lb./in.² and ½ sec. dwell time. Range is expressed in ° F. between first acceptable heat seal and burn thru of film.

The same increase in coefficient of friction and gloss are seen in Table II as was seen in Table I. In Table II, however, the significant factor is the increased heat seal range exhibited by the composites as compared with 100% polyethylene or 100% copolymer films. The reason for this "burn-through" barrier presented by the polystyrene core is not immediately apparent. The same effect has been noted also for composites of polypropylene and polystyrene although not so dramatic as in this case.

The composite films present several advantages over conventional laminates, particularly with regard to handling. For example, bonding between the component polymers is greatly facilitated since these make their initial contact while in the molten state so that adhesion between plies comes about by means of fusion rather than by chemical association or adhesive bonding. Not only does this facilitate handling of the films, it results in better bonding in many cases. Additionally, no handling of the individual plies prior to uniting the same is required. Thus it is not necessary that individual plies be strong enough to resist handling or heavy (i.e., thick and stiff) enough to permit convenient handling.

What I claim and desire to protect by Letters Patent is:

1. A composite film comprising a core layer of extruded polystyrene having adhered to both of its surfaces a co-extruded layer of a crystalline olefin polymer, said composite film having a total thickness of about ½ to 20 mils and said polystyrene core layer comprising about 5 to 40% of the total mass of the film wherein all the layers are coextruded.

2. The composite film of claim 1 where the olefin polymer is selected from the class consisting of crystalline polyethylene, crystalline polypropylene, crystalline copolymers of ethylene and propylene and crystalline copolymers of ethylene with up to about 10% vinyl acetate.

3. The composite film of claim 2 having a thickness of about ½ to 3 mils.

References Cited

UNITED STATES PATENTS

| | | | |
|---|---|---|---|
| 2,990,306 | 6/1961 | Dyer | 161—254X |
| 3,340,091 | 9/1967 | Zweig | 161—252X |
| 2,700,695 | 1/1955 | Gottschall | 136—166 |
| 3,184,358 | 5/1965 | Utz | 161—247X |

FOREIGN PATENTS

| | | | |
|---|---|---|---|
| 229,472 | 4/1958 | Australia | 161—254 |
| 723,154 | 12/1965 | Canada | 161—252 |

OTHER REFERENCES

"Plastics World," "Laminated and Coated Polyolefin Films," Jordan, G., April 1964, pp. 56, 57.

"Modern Plastics Encyclopedia," vol. 44, No. 1A, the annual issue, September 1966 of "Modern Plastics," pp. 235, 239, McGraw-Hill, New York.

JOHN T. GOOLKASIAN, Primary Examiner

C. B. COSBY, Assistant Examiner

U.S. Cl. X.R.

156—244; 161—252, 254